United States Patent
Finney et al.

(10) Patent No.: US 8,625,422 B1
(45) Date of Patent: Jan. 7, 2014

(54) PARALLEL PROCESSING USING MULTI-CORE PROCESSOR

(71) Applicant: Unbound Networks, San Carlos, CA (US)

(72) Inventors: Damon Finney, San Jose, CA (US); Ashok Mathur, San Carlos, CA (US)

(73) Assignee: Unbound Networks, San Carlos, CA (US)

( * ) Notice: Subject to any disclaimer, the term of this patent is extended or adjusted under 35 U.S.C. 154(b) by 0 days.

(21) Appl. No.: 13/786,144

(22) Filed: Mar. 5, 2013

Related U.S. Application Data

(60) Provisional application No. 61/740,374, filed on Dec. 20, 2012.

(51) Int. Cl.
*H04L 12/50* (2006.01)

(52) U.S. Cl.
USPC ........... 370/230; 370/235; 370/389; 707/764; 709/223; 712/11; 712/16

(58) Field of Classification Search
None
See application file for complete search history.

(56) References Cited

U.S. PATENT DOCUMENTS

| | | | |
|---|---|---|---|
| 6,119,215 A | 9/2000 | Key et al. | |
| 6,523,060 B1 | 2/2003 | Kao | |
| 7,088,731 B2 | 8/2006 | Iny | |
| 7,725,573 B2 | 5/2010 | Raghunath et al. | |
| 7,792,027 B2 | 9/2010 | Tatar et al. | |
| 2002/0154648 A1 | 10/2002 | Araya et al. | |
| 2003/0179706 A1 | 9/2003 | Goetzinger et al. | |
| 2006/0056406 A1* | 3/2006 | Bouchard et al. | 370/389 |
| 2007/0169001 A1* | 7/2007 | Raghunath et al. | 717/130 |
| 2009/0235050 A1 | 9/2009 | Raghunath et al. | |
| 2012/0159464 A1 | 6/2012 | Demetriou et al. | |
| 2013/0013838 A1* | 1/2013 | Sakamoto et al. | 710/305 |
| 2013/0086279 A1* | 4/2013 | Archer et al. | 709/233 |

OTHER PUBLICATIONS

Non-Final Office Action mailed Oct. 15, 2013, for U.S. Appl. No. 13/786,232 by Finney, D., et al., filed Mar. 5, 2013.
Notice of Allowance mailed Oct. 9, 2013, for U.S. Appl. No. 13/786,306 by Finney, D., et al., filed Mar. 5, 2013.

* cited by examiner

*Primary Examiner* — Chi Pham
*Assistant Examiner* — Shick Hom
(74) *Attorney, Agent, or Firm* — Perkins Coie LLP

(57) ABSTRACT

Disclosed are methods, systems, paradigms and structures for processing data packets in a communication network by a multi-core network processor. The network processor includes a plurality of multi-threaded core processors and special purpose processors for processing the data packets atomically, and in parallel. An ingress module of the network processor stores the incoming data packets in the memory and adds them to an input queue. The network processor processes a data packet by performing a set of network operations on the data packet in a single thread of a core processor. The special purpose processors perform a subset of the set of network operations on the data packet atomically. An egress module retrieves the processed data packets from a plurality of output queues based on a quality of service (QoS) associated with the output queues, and forwards the data packets towards their destination addresses.

29 Claims, 15 Drawing Sheets

PARALLEL PROCESSING USING MULTI-CORE PROCESSOR

CLAIM OF PRIORITY

This application claims the benefit of U.S. Provisional Application Ser. No. 61/740,374, filed on Dec. 20, 2012.

FIELD OF INVENTION

This invention generally relates to parallel processing. More specifically, the invention relates to parallel processing using multi-core processors.

BACKGROUND

A multi-core processor is a single computing component with two or more independent actual central processing units (called "cores"), which are the units that read and execute program instructions. Multi-core processors are used across many application domains including general-purpose, embedded, network, digital signal processing (DSP), and graphics. The improvement in performance gained by the use of a multi-core processor depends very much on the software algorithms used and their implementation. In particular, possible gains are limited by the fraction of the software that can be run in parallel simultaneously on multiple cores.

In multi-core network processing, a key challenge is how to exploit all the cores in these devices to achieve maximum networking performance, despite the performance limitations inherent in a symmetric multiprocessing operating system. In the current multi-core network processor architecture, the processing of a data packet is done by one or more core processors. The synchronization between various core processors and various threads of core processors, memory management, etc. are achieved through software programming. Further, when the processing of the data packet passes from one core to another core, the state or synchronization information is passed between the cores or between the threads of the core processing the data packet.

Significant resources are consumed in passing the state/synchronization information between the threads or the processors which reduces the availability of the resources for performing actual network application related tasks. Therefore, the overhead of passing the state/synchronization information decreases the efficiency of the processor.

Further, in current architecture, the core processor does not perform any useful network related operation while waiting for the arrival of the next data packet. The core processor may be idle until the next data packet arrives at the core processor. In current systems that have multi-core processors with an array of pipelined special purpose cores, the multi-core processor is limited by the capabilities of the special cores and pipeline depth. The multi-core is also limited by the slowest core.

SUMMARY

Introduced here are methods, systems, paradigms and structures for parallel processing using multi-core processors. The disclosed solution can be used in various applications such as general purpose processing, network processing, storage systems, etc. In one embodiment, the above multi-core processor may be used as a (network) processor in a communication network for processing data packets. The network processor includes a plurality of multi-threaded core processors and a plurality of special purpose processors for processing the data packets atomically and in parallel. The network processor processes a data packet by performing a set of network operations on the data packet. The set of network operations can be based on applications/network protocols such as Resource Reservation Protocol (RSVP).

A particular data packet is processed by a single core processor and by a single thread of the core processor. The core processor may request one or more special purpose processors to perform a subset of the set of network operations on the data packet. A special purpose processor is any processing element that exclusively handles all accesses and updates to a specific set of shared resources such that those shared resources are always accessed and updated atomically. The special purpose processor may be hardware specifically designed to handle certain types of state data (for example, meters, queues, statistics, Volume Table of Contents (VTOCs), etc.) or general purpose cores which have been dedicated to processing the specified set of shared resources. The one or more special-purpose processors processes the data packet by performing the set of operations atomically. That is, the network processor ensures that the shared resources of the network processor used for processing the particular data packet is not used by other resources of the network processor while the particular data packet is being processed. This locking out of the shared resources involved in the process ensures the atomicity of the process.

An ingress module in the network processor allocates memory for the incoming data packets and stores the data packets in a memory of the network processor. The ingress module generates a packet buffer chain linking various buffers containing portions of the data packet, for a data packet whose size exceeds the buffer size. The ingress module adds the incoming data packets to an input queue from which one of the core processors retrieves a data packet for further processing. An output packet processor in the network processor adds the processed data packet to one of a plurality of output queues based on a quality of service (QoS) associated with the output queue and forwards the data packets contained in the output queues towards their destination addresses based on the QoS.

Since a single thread of the core processor performs all the set of network operations on the data packet, no state information or synchronization information is passed between processors, which results in faster and more efficient processing of data packets. Also, the number of memory reads and writes are minimized reducing the delay caused due to memory reads and writes. The discussed method, systems, structures and paradigms increase a number of effective operations per packet (EOPP), that is, the number of instructions that can be performed on the data packet to perform application related tasks.

Some embodiments of the invention have other aspects, elements, features, and steps in addition to or in place of what is described above. These potential additions and replacements are described throughout the rest of the specification.

DETAILED DESCRIPTION

Figure 1:
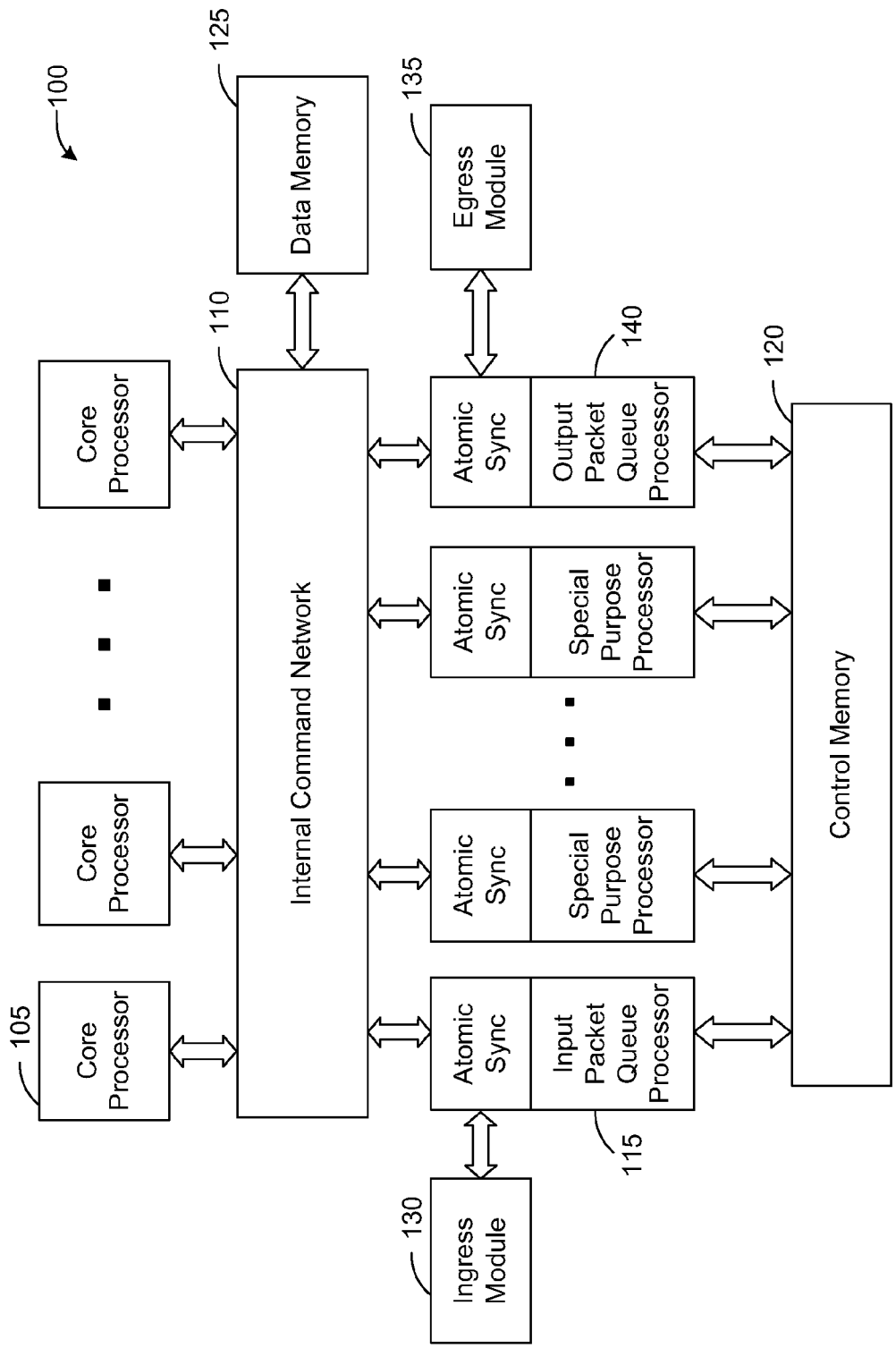
FIG. 1 is an example network processor in which an embodiment of the invention may operate.

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Introduced here are methods, systems, paradigms and structures for parallel processing using multi-core processors. The disclosed solution can be used in various applications such as general purpose processing, network processing, storage systems, etc. In one embodiment, the above multi-core processor may be used as a network processor in a communication network for processing data packets. The network processor processes a data packet by performing a set of network operations on the data packet. The set of network operations can be based on applications/network protocols such as Resource Reservation Protocol (RSVP).

A particular data packet is processed by a single core processor and by a single thread of the core processor. The core processor may request one or more special purpose processors to perform a subset of the set of network operations on the data packet. The one or more special purpose processors processes the data packet by performing the set of operations atomically. That is, the network processor ensures that the shared resources of the network processor used for processing the particular data packet is not used by other resources of the network processor while the particular data packet is being processed.

An ingress module in the network processor allocates memory for the incoming data packets and stores the data packets in a memory of the network processor. The ingress module generates a packet buffer chain linking various buffers containing portions of the data packet, for a data packet whose size exceeds the buffer size. The ingress module adds the incoming data packets to an input queue from which one of the core processors retrieves a data packet for further processing. An output packet processor in the network processor adds the processed data packet to one of a plurality of output queues based on a quality of service (QoS) associated with the output queue and forwards the data packets contained in the output queues towards their destination addresses based on the QoS.

Since a single thread of the core processor performs all the set of network operations on the data packet, no state information or synchronization information is passed between processors, which results in faster and more efficient processing of data packets. Also, the number of memory reads and writes are minimized reducing the delay caused due to memory reads and writes. The discussed method, systems, structures and paradigms increase a number of effective operations per packet (EOPP), that is, the number of instructions that can be performed on the data packet to perform application related tasks.

FIG. 1 is an example network processor 100 in which an embodiment of the invention may operate. Data packets from various source computer systems (not shown) are transmitted to destination computer systems (not shown) via a communication network (not shown). The communication network includes various systems such as routers (not shown) that facilitate forwarding the data packets towards their corresponding destination addresses. The routers perform operations including receiving the data packets, performing error checking on the received data packets, finding next hop addresses for the data packets, fragmenting the data packets etc. before the packets are forwarded to their corresponding next hop addresses. In an embodiment, the network processor 100 may be used in such routers to perform the above discussed operations.

The network processor 100 includes a plurality of multi-threaded core processors such as core processor 105, a plurality of special purpose processors such as special purpose processor 115, a memory such as control memory 120 and data memory 125, an ingress module 130 to receive and store incoming data packets in the memory, and an egress module 135 to forward the processed data packets towards their destination addresses. An internal command network 110 such as a crossbar switch enables communication between various components in the network processor 100.

Each of the core processors processes data packets. However, a data packet is processed by a single core processor, such as core processor 105, and by a single thread of the core processor 105. The core processor 105 processes the data packet by performing a set of network operations on the data packet. The core processor 105 may request one or more special purpose processors to perform a subset of the set of network operations on the data packet. The one or more special purpose processors processes the data packet by performing the subset of the set of network operations atomically. That is, the network processor 100 ensures that the shared resources of the network processor 100 used for processing the particular data packet is not used by other resources of the network processor 100 while the particular data packet is being processed by the core processor 105 or the special purpose processor 115.

The core processors and special purpose processors perform the set of network operations in parallel. The set of network operations performed on the data packet can be based on applications/network protocols such as Resource Reservation Protocol (RSVP). In an embodiment, the RSVP can be a protocol defined by Request For Comment (RFC) 2475. The set of network operations in RSVP (RFC 2475) can include receiving data packets, performing error handling, performing table look up operations, metering, generating statics, policing or congestion control, forwarding data packets towards their destination addresses etc.

In an embodiment, the special purpose processors may perform frequently executed tasks such as table lookup for finding next hop address for the data packet, metering, policing, congestion control etc. The core processors may perform tasks such as error checking, overseeing the operations performed by the special purpose processors etc. In an embodiment, the network processor 100 may have one special purpose processor for each of the identified network operations. However, in another embodiment, the network processor 100 may have a special purpose processor execute more than one network operation. The network processor 100 ensures that certain operations on the data packets are performed atomically by using a semaphore associated with a thread requesting an operation on the data packet.

A semaphore is used for signaling a target processor such as a core processor or a special purpose processor when a request has been accomplished and any data is safe to use. For example, a semaphore attached with a table update operation may be tested by the core processor 105 to determine if the results of the table lookup have been returned to the core processor 105. The thread on the core processor 105 may continue doing other tasks after sending any request(s) to one or more special purpose processors, until the thread needs to use the results of the request(s). Before using the results of any request, the core processor 105 will test the semaphore that was attached to the specific request. If the request has been completed and the results have been returned to the core processor 105, then the thread will continue processing. If the request has not been completed then the core processor 105 will put the thread in sleep mode when the semaphore is tested, and will switch to processing other threads. When the semaphore is returned, the core processor 105 will wake the thread and the thread will continue processing as if the semaphore had been available at the time of the test.

The core processors obtain the data packets from an input queue of the special purpose processor such as input packet queue processor 115. The core processor 105 may request the input packet queue processor 115 to return a data packet. The requests from the core processors are added to a request queue, and are served on a First-In-First-Out (FIFO) basis. The request queue may have requests from various threads of each of the core processors. For example, if there are four core processors in the network processor 100 and each of the four core processors can execute three threads, the request queue can have up to twelve (4×3) requests in the request queue.

The ingress module 130 performs memory management operations including (i) allocating memory to incoming data packets, and (ii) storing the incoming data packets in the memory. The ingress module 130 stores the data packets in a memory such as data memory 125. Further, the ingress module 130 may store pointers to the data packets in control memory 120. In an embodiment, access to the data packets is provided by control memory 120. The data packets are stored in the buffers of data memory 125. Each of the buffers is of a configurable size. If the size of the data packet exceeds the size of the buffer, the ingress module 130 splits the data packet and stores portions of the data packet in a plurality of buffers. The ingress module 130 generates a data packet buffer chain for the data packet. The data packet buffer chain is a pointer structure that links buffers containing various portions of the data packet. After the data packet buffer chain is created, the data packet is added to the input queue by adding a pointer to the data packet buffer chain. If the input queue already contains data packets, the data packet buffer chain of the last data packet in the input queue is linked to the data packet buffer chain of the newly added data packet.

The input packet queue processor 115 returns a data packet from the head of the input queue to a thread that is first in the request queue. If there are no data packets in the input queue, the requesting thread is switched to sleep mode until a data packet is available to be returned to the thread. When a data packet is returned to a thread of the core processor 105, the core processor 105 performs the set of network operations on the data packet in the single thread. The core processor 105 may request one or more special purpose processors to perform a subset of the network operations atomically. While the special purpose processors are performing the operations atomically, the thread of the core processor 105 which requested the special purpose processor may be switched to sleep mode until a result of execution by the special purpose processor is posted back to the thread. Putting this core processor into sleep mode at this point avoids semaphore wait cycles and enables the other processors to more efficiently concentrate on processing background tasks.

After the data packet is processed, the core processor 105 requests a special purpose processor such as an output packet queue processor 140 to add the processed data packet to one of a plurality of output queues. The output packet queue processor 140 adds the data packet to a particular output queue based on the QoS contracted to the data packet. An egress module 135 retrieves the data packets from the output queues based on the QoS of the output queues and forwards the data packets towards their corresponding destination addresses. After the data packet is forwarded to the next hop address, the memory allocated to the data packet is released or freed by the output packet queue processor 140.

In an embodiment, the control memory 120 and data memory 125 may be on the same or different physical memory devices in the network processor 100. The control memory 120 has a list of all the buffers in the data memory 125. The list in the control memory 120 can be a one-to-one mapping to the buffers in the data memory 125. In an embodiment, the one-to-one mapping can include pointers to buffers of the data memory 125. The one-to-one mapping in control memory 120 has a pointer to any given address of a data buffer.

The control memory 120 or data memory 125 represents any form of random access memory (RAM), flash memory, content addressable memory (CAM) such as ternary CAM, or the like, or a combination of such devices. In use, the control memory 120 may contain data structures such as packet buffer chain, output packet queue header structures and data structures having commands such as memory read or memory write that are executed often.

The internal command network 110 can be a distributed crossbar switch or data network or semaphore network that facilitates communication between various components such as core processors, special purpose processors, control memory, data memory, etc. in the network processor 100. The internal command network 110 takes input from the core processors and outputs it to a particular destination. For example, if a core processor wants to write data to the control memory 120, the input can be the data and the destination can be control memory 120. The internal command network 110 contains a plurality of switches, wherein each of the core processors is connected to a series of switches that would connect a particular core processor to a particular destination.

The network processor 100 executes various operations such as network operations, memory management, etc. using special purpose hardware processors. Further, since all of the network operations on the data packet are performed in a single thread of a core processor, there is no overhead of passing state information or synchronization information between various stages of processing. Also, the memory management is performed by hardware modules such as ingress module 130, input packet queue processor 115, output packet queue processor 140, etc. Accordingly, the performance offered by the network processor 100 is significantly increased. Further, the programming model to execute the set of network operations can be a single threaded programming model which is less complex than multi-threaded programming.

Figure 2:
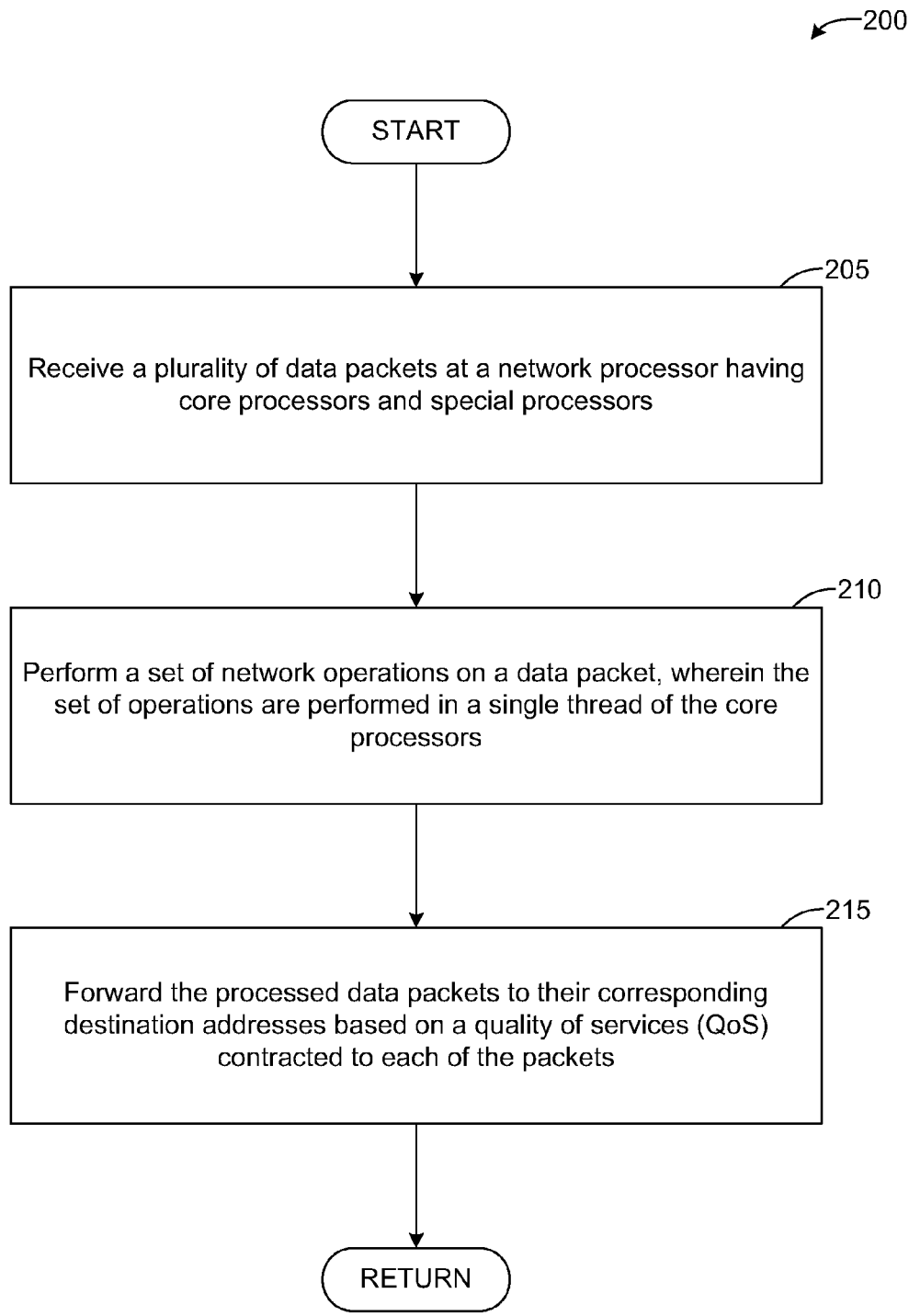
FIG. 2 is a flow diagram illustrating a process of processing data packets by a network processor.

FIG. 2 is a flow diagram illustrating a process 200 of processing data packets by a network processor, according to an embodiment of the disclosed technique. The process 200 may be executed in a network processor such as network processor 100 of FIG. 1. At step 205, the network processor 100 receives a plurality of data packets from one or more source computer systems in a computer network. At step 210, the network processor 100 performs a set of network operations on each of the data packets. The set of network operations performed can be based on a particular application/networking protocol. Each of the data packets are processed in a single thread of a specific core processor of the network processor 100. At step 215, the network processor 100 forwards the processed data packets towards their corresponding destination addresses based on a QoS contracted to the data packets.

Figure 3:
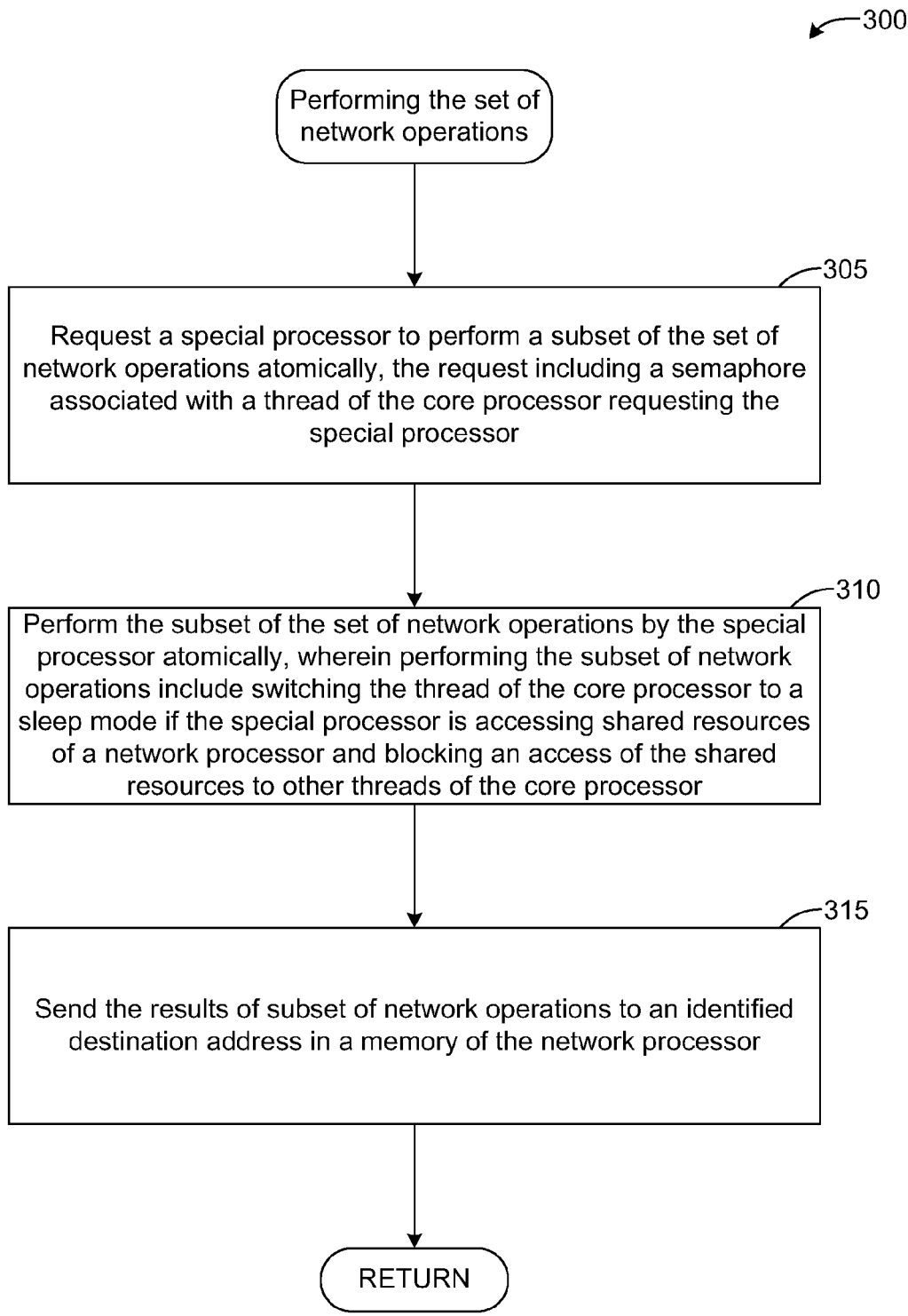
FIG. 3 is a flow diagram illustrating a process for performing a set of network operations on a data packet in a single thread of a core processor.

FIG. 3 is a flow diagram illustrating a process 300 for performing a set of network operations on a data packet in a single thread of a core processor, according to an embodiment of the disclosed technique. The process 300 may be executed in a network processor such as network processor 100 of FIG. 1. Certain network operations are performed by a core processor and certain by special purpose processors of the network processor 100. In an embodiment, frequently executed operations may be performed by special purpose processors. For example, in a network processor 100 executing networking protocol such as RSVP (RFC 2475), network operations such as metering, policing, generating statistics etc. can be executed by special purpose processors.

At step 305, a core processor such as the core processor 105 requests the special purpose processors to execute a subset of the set of network operations atomically. The core processor 105 attaches a semaphore to a thread of the core processor 105 requesting the operation. At step 310, the special purpose processor performs the subset of the set of network operations on the data packet atomically. At step 315, the special purpose processor posts the results of the execution of the operations to a specified memory address.

Referring back to step 310, performing the set of operations atomically includes ensuring that while a shared resource of the network processor 100 is being updated by a particular resource, other resources are not allowed to access the shared resource. The semaphore attached to the thread of the core processor 105 switches the thread to a sleep mode until the special purpose processor has completed executing the operation on the data packet and posted the results of the execution to a specified memory address. After the special purpose processor has completed executing the operation, the semaphore wakes up the thread of the core processor and the rest of the network operations are continued. In an embodiment, if the thread of the core processor is not dependent on the results of execution of the operations by the special purpose processor, the thread may not be switched to sleep mode. The thread may continue processing the next set of operations on the data packet.

Figure 4:
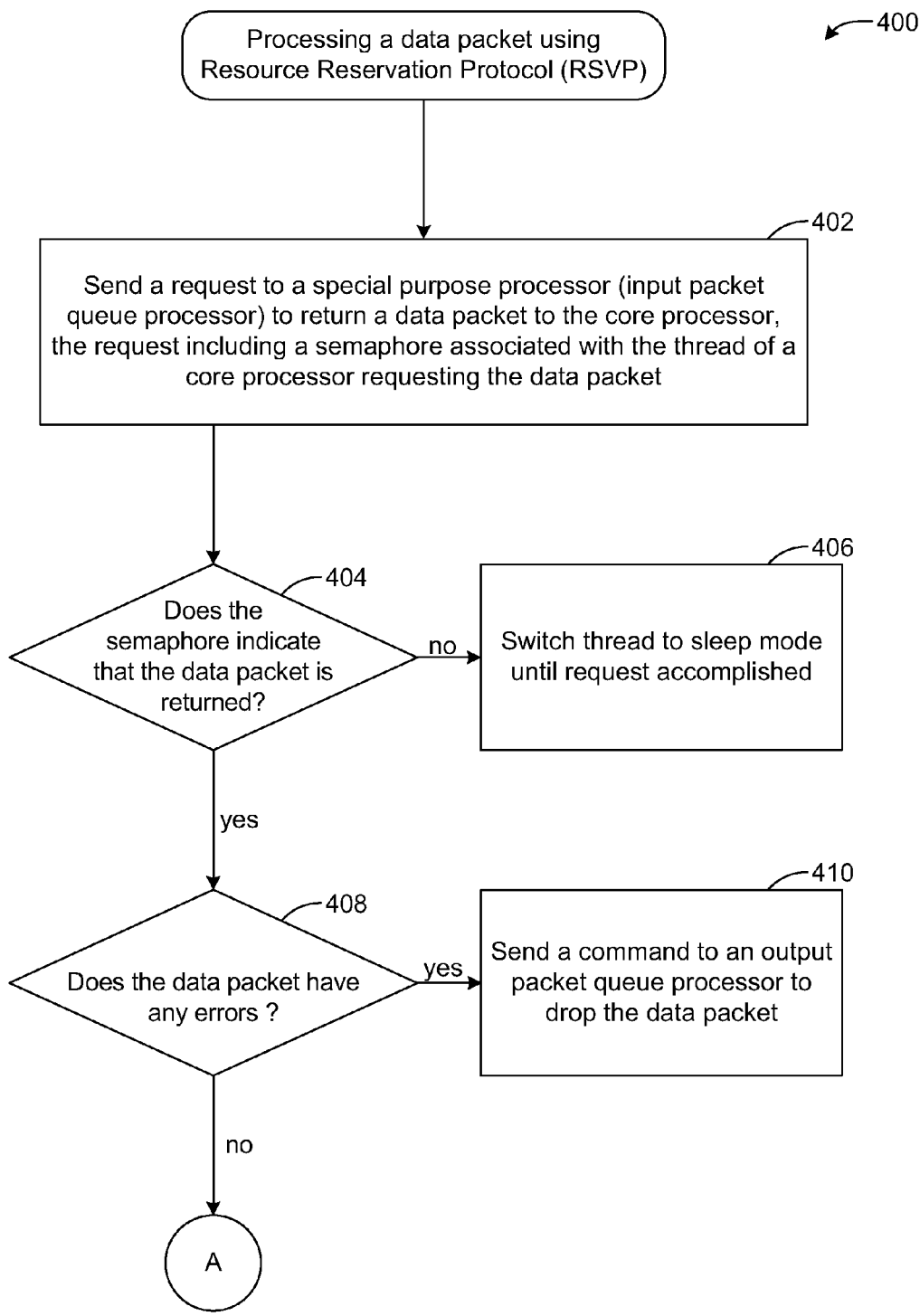
FIG. 4 is a flow diagram illustrating a process of processing data packets per RSVP (RFC 2475) application/networking protocol in the network processor of FIG. 1.
Figure 4:
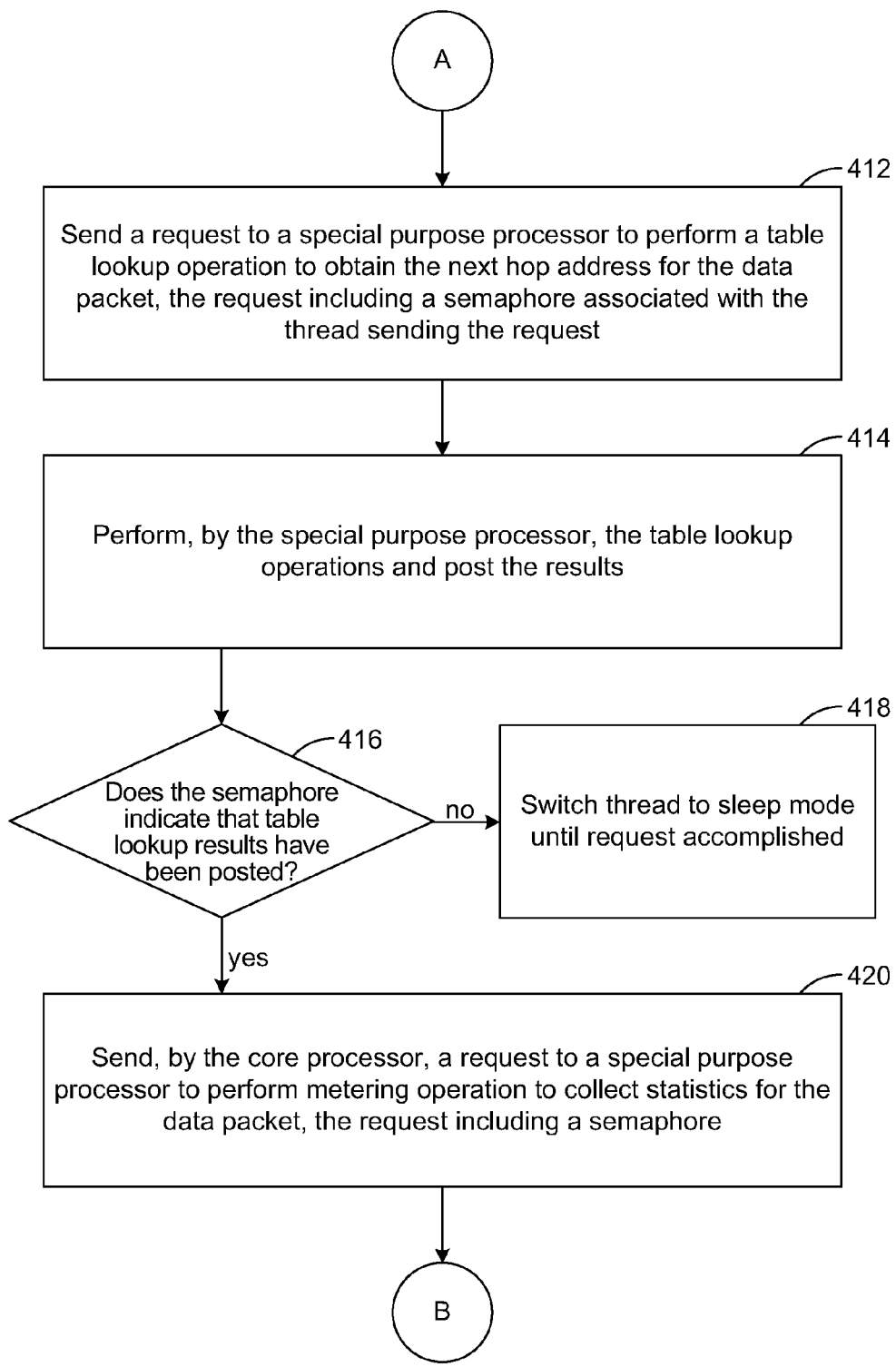
Figure 4:
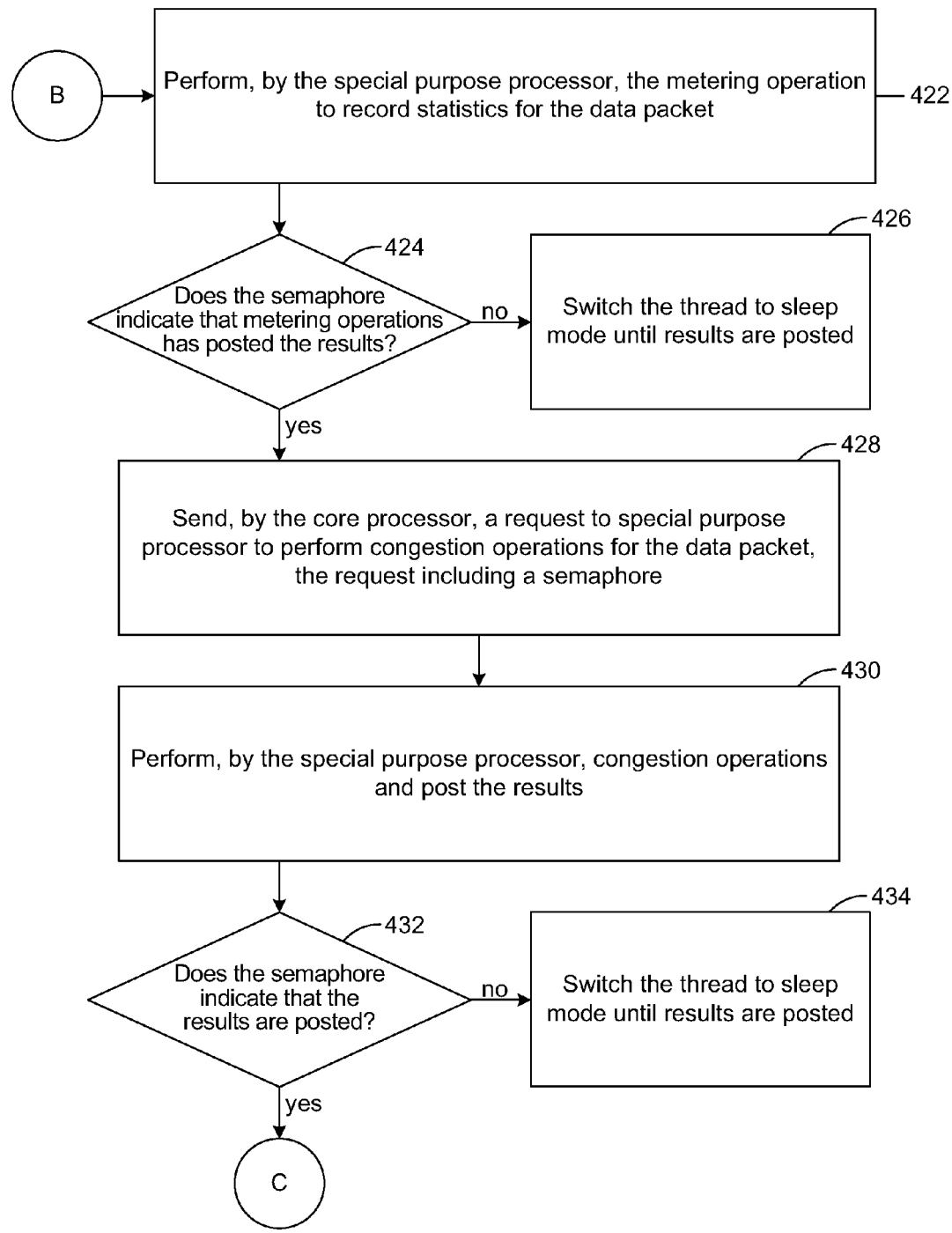
Figure 4:
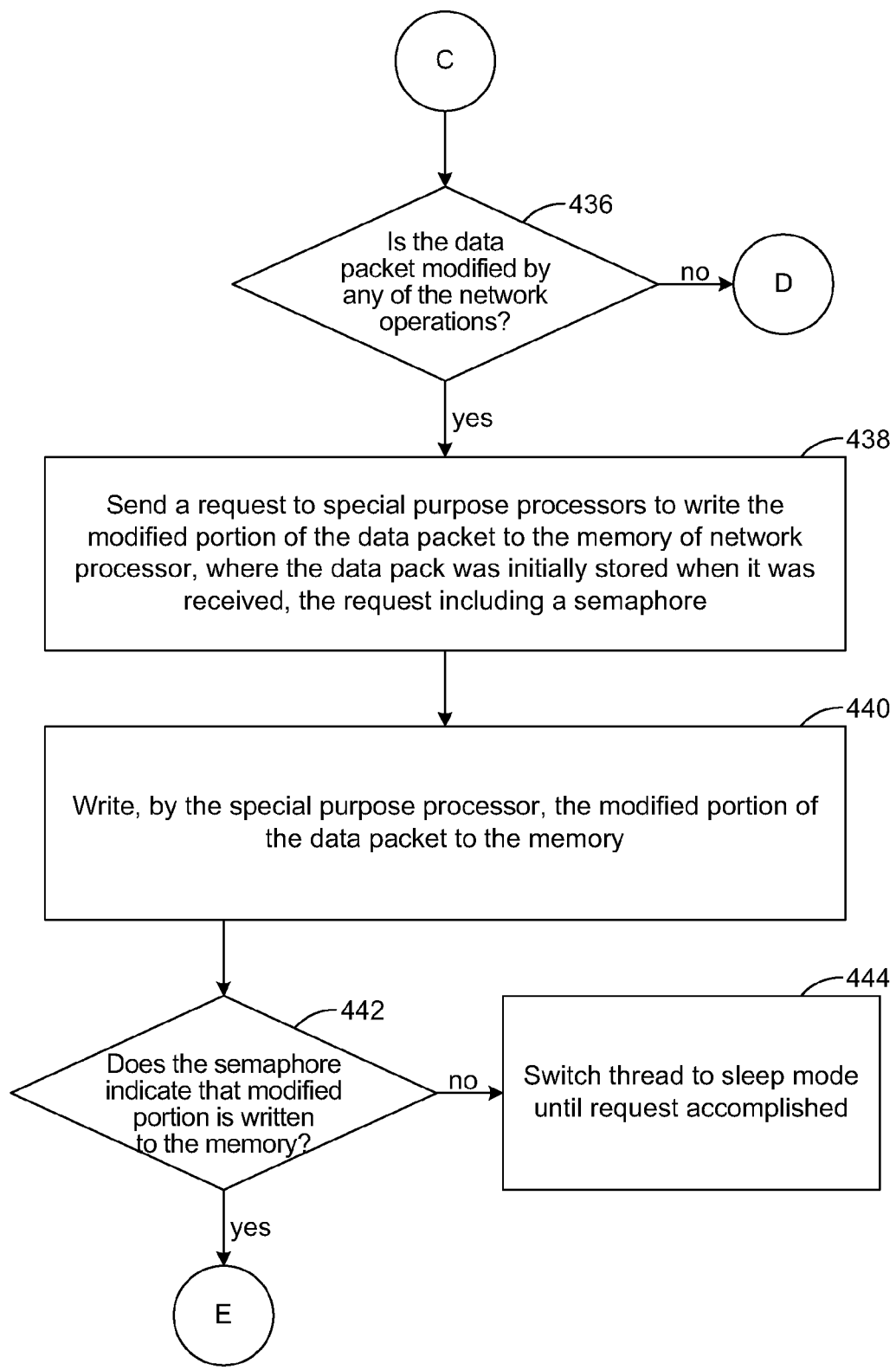
Figure 4:
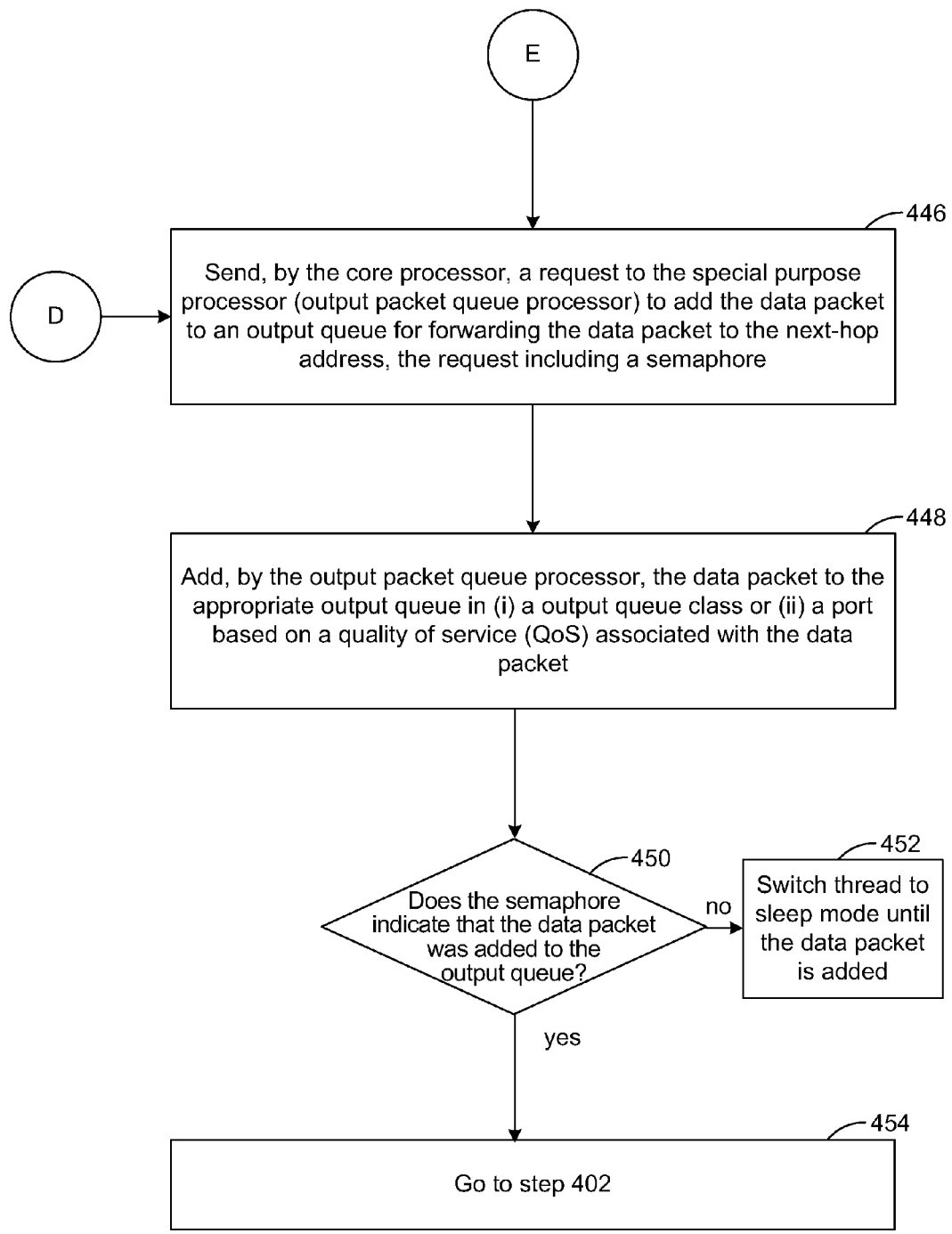

FIG. 4 is a flow diagram illustrating a process 400 of processing data packets using RSVP (RFC 2475) application/networking protocol, according to an embodiment of the disclosed technique. The process 400 may be executed in a network processor such as network processor 100 of FIG. 1. At step 402, a thread of a core processor such as core processor 105 sends a request to an input packet queue processor 115 to obtain a data packet. The request also includes a semaphore associated with the thread. If the request queue of the input packet queue processor 115 already has requests from other threads of the core processor 105 or other core processors, the request from the specific thread of the core processor 105 is added to the request queue on a FIFO basis.

At determination step 404, the core processor 105 determines whether the semaphore has indicated that the input packet queue processor 115 returned the data packet to the thread. Responsive to a determination that the input packet queue processor 115 has not returned the data packet to the thread, at step 406, the thread is switched to sleep mode until a data packet is returned to the thread. On the other hand, responsive to a determination that the input packet queue processor 115 has returned the data packet to the thread, the core processor 105 continues processing the data packet at step 408. In an embodiment, when the data packet is returned to the core processor 105, the input queue packet processor 115 returns a pointer to the data packet stored in the data memory 125 of the network processor 100. Further, a portion of the data packet, such as a header of the data packet, is read from the data memory 125 and written into a local memory of the core processor 105. The core processor 105 may refer to the portion stored in the local memory while processing the data packet.

At determination step 408, the core processor 105 determines whether there are any errors in the data packet. The errors detected include, for example, size of the data packet. If the size of the data packet is lesser than a predefined minimum data packet size, the core processor 105 determines that the data packet is an erroneous data packet. The core processor 105 may also check for other errors by computing a checksum for the data packet. Initially, when the packet arrives, the ingress module 130 computes the checksum to validate whether the data packet was received correctly. The checksum may be modified corresponding to any modifications to the data packet by the core processor 105. Responsive to a determination that the data packet is an erroneous data packet, at step 410, the core processor 105 sends a request to the output packet queue processor 140 to drop the data packet. On the other hand, responsive to the determination that the data packet is not an erroneous data packet, the core processor 105 continues processing the data packet at step 412.

At step 412, the core processor 105 sends a request to a special purpose processor to perform a table lookup operation to determine the next hop address for the data packet. The request also includes a semaphore associated with the thread. At step 414, the special purpose processor performs the table lookup operations to determine the next hop address for the data packet and posts the results to a specified memory address. The network processor 100 supports both IPv4 and IPv6, that is, IP versions 4 and 6. Also, the special purpose processor may also determine a queue identification (ID) of an output queue, to which the data packet may be added, based on a QoS contracted to the data packet. In an embodiment, the table lookup operations can also include reverse path validation and microflow parameters. Microflow is a single instance of an application-to-application flow of packets which is identified by source address, source port, destination address, destination port and protocol id. The next hop address can include an Internet Protocol (IP) address.

At determination step 416, the core processor 105 determines whether the semaphore has indicated that table lookup operations have executed and results have been posted to a specific location in the memory. Responsive to a determination that the results have not been posted yet, at step 418, the thread of the core processor 105 is switched to a sleep mode until the results are posted. On the other hand, responsive to a determination that the table lookup results have been posted, the core processor 105 continues processing the data packet at step 420.

At step 420, the core processor 105 sends a request to a special purpose processor for performing metering operations. The request also includes a semaphore associated with the thread of the core processor 105. In an embodiment, metering operations, per RFC 2475, can include measuring the temporal properties (e.g., rate) of a traffic stream selected by a classifier (which identifies particular data packets). The instantaneous state of this process may be to affect the operation of a marker, shaper, or dropper, and/or may be used for accounting, measurement or congestion control purposes.

At step 422, the special purpose processor performs the metering operations for the data packet. At determination step 424, the core processor 105 determines whether the semaphore indicates that the metering operations have executed and results have been posted. Responsive to a determination that the metering results have not been posted, at step 426, the thread of the core processor 105 is switched to sleep mode until the results are posted. On the other hand, responsive to a determination that the metering operations have completed executing and the results are posted, the core processor 105 continues processing the data packet at step 428.

At step 428, the core processor 105 sends a request to a special purpose processor to perform congestion control or policing operations on the data packet. In an embodiment, the congestion control, per RFC 2475, is a process of discarding packets within a traffic stream in accordance with the state of a corresponding meter enforcing a traffic profile. The data packets may be dropped based on the data obtained from the metering operations. The request from the core processor 105 also includes a semaphore associated with the thread of the core processor 105 requesting the special purpose processor.

At step 430, the congestion control operations are performed by the special purpose processor. At determination step 432, the core processor 105 determines whether the semaphore has indicated that the congestion control process has executed and posted the results. Responsive to a determination that the results of the congestion control operations are not yet available, at step 434, the thread of the core processor 105 is switched to sleep mode until the results are posted. On the other hand responsive to a determination that the congestion control results have been posted, the core processor 105 continues processing the data packet at step 436.

At determination step 436, the core processor 105 determines if a portion of the data packet, such as the header of the data packet stored in the local memory of the core processor 105, has been modified by any of the set of network operations. In an embodiment, certain operations such as fragmenting the data packet, updating the checksum, time to live (TTL) for the data packet etc. modify certain portions of the data packet. Responsive to a determination that the data packet is not modified, the control is transferred to step 446. On the other hand, responsive to a determination that the portion of the data packet is modified, at step 438, the core processor 105 sends a request to a special purpose processor to write the modified portion of the data packet from the local memory of the core processor 105 to the data memory 125. The core processor 105 also includes a semaphore with the request.

At step 440, the special purpose processor executes the memory write operation to write the modified portions of the data packet to the data memory 125. At determination step 442, the core processor 105 determines whether the semaphore has indicated that the memory write operation has executed and the modified portion of the data packet has been written to the data memory 125. Responsive to a determination that the memory write operation has not yet completed writing the modified portion of the data packet, the thread of the core processor 105 is switched to sleep mode until the modified portion is written to the data memory 125. On the other hand, responsive to a determination that the modified portion has been written to the data memory 125, the core processor 105 continues processing the data packet at step 446.

At step 446, the core processor 105 sends a request to the output packet queue processor 140 to add the data packet to an output queue. The core processor 105 also includes a semaphore with the request. At step 448, the output packet queue processor 140 executes queuing operations to add the data packet to an appropriate output queue. In an embodiment, the output packet queue processor 140 identifies the output queue based on the queue ID of the data packet determined during the table lookup operations.

At determination step 450, the core processor 105 determines whether the semaphore indicates that the data packet has been added to the output queue. Responsive to a determination that the data packet is not yet added to the output queue, at step 452, the thread of the core processor 105 is switched to sleep mode until the data packet is added to the output queue. On the other hand, responsive to a determination that the data packet is added to the output queue, the core processor 105 determines that the thread has completed processing the data packet. At step 454, the thread of the core processor 105 can start processing a next data packet by sending a request to the input packet queue processor 115.

Further, the egress module 135 obtains data packets from the output queues based on the QoS associated with the output queues and forwards the data packets towards their corresponding destination addresses.

Each of the core processors of the network processor 100 and each of the threads of a particular processor can perform the above discussed operations on different data packets in parallel.

Referring back to the operations discussed in FIG. 4, the network processor 100 executes certain commands for every data packet that is processed by the network processor 100. Further, these commands are similar for every thread of the core processor. The network processor 100 creates data structures to store the commands, and initializes the data structures even before a first thread of a first processor requests a data packet from the input queue processor. In an embodiment, the commands include (a) memory reads—reading data (data packet header and data packet descriptor) from data memory 125 to a local memory of a core processor, (b) memory writes—writing modified data (data packet header and data packet descriptor) from local memory of core processor to the data memory, (c) adding the data packet to an output queue (d) updating error counters for the data packets, (e) table look up commands, (d) metering commands, (f) congestion control commands etc. Initializing or pre-allocating memory to the data structures for the above commands even before the network processor 100 starts processing the first data packet and using the data structures for every thread of every core processor reduces the time consumed for performing these common administration operations for every data packet. The network processor 100 can utilize its processing power on performing the network protocol related tasks and thus, increasing the number of EOPP. All of the strands in the network processor may not be running 'similar' code.

Although it is possible for all threads to be running similar code, for example, code for processing incoming data packets, in an embodiment, not every thread of a core processor 105 may be processing the data packets. It is possible to program such that only a subset of the threads are processing incoming packets. Other threads could be programmed to execute tasks, for example, background tasks, that would only run when the higher priority threads (processing incoming data packets) are in sleep mode.

The architecture of the network processor 100 allows the processes such as (a) input data packet operations—receiving the input data packets and adding them to the input queue, (b) processing the data packets by the core processors, and (c) output data packet operations—forwarding the data packets from the output queues to their corresponding destination addresses, to execute independently. That is, for example, the architecture separates a requirement for when a data packet is received by a network processor 100 and when the data packet is processed. The data packet is added to the input queue when it arrives at the network processor 100, and the core processor may retrieve the data packet from the input queue at a later time, for example, when the core processor is ready, to process the data packet. Such an architecture allows the network processor 100 to spend as much time as it is necessary or required for processing a data packet, for example, for performing deep packet inspection, before moving on to the next one.

Figure 5:
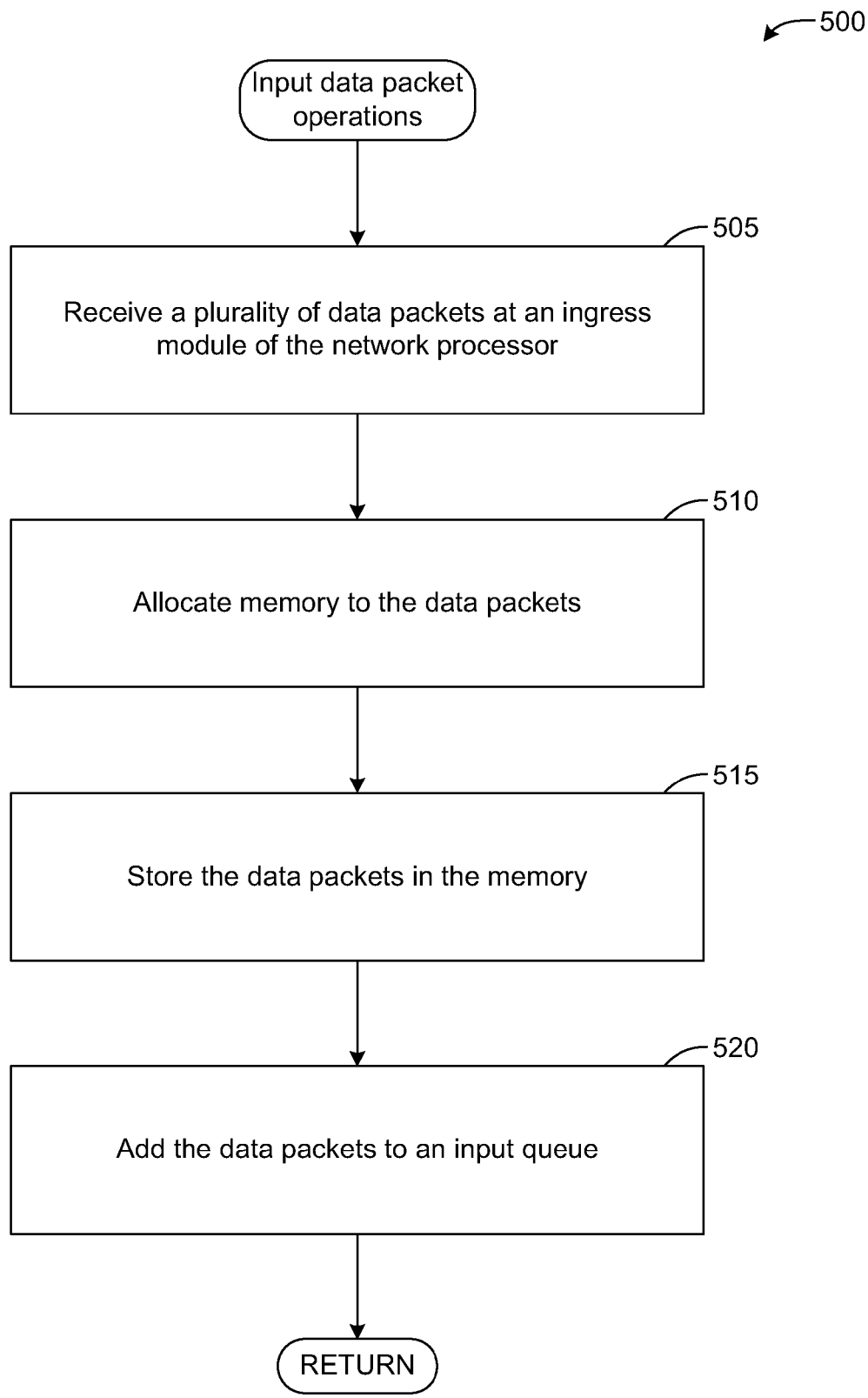
FIG. 5 is a flow diagram illustrating a process of processing input data packets.

FIG. 5 is a flow diagram illustrating a process 500 of processing input data packets, according to an embodiment of the disclosed technique. The process 500 may be executed in a network processor such as network processor 100 of FIG. 1. At step 505, the ingress module 130 receives a data packet. The data packet may be received from various computers in a computer network the network processor 100 is part of. At step 510, the ingress module 130 (or a memory allocation module working in cooperation with the ingress module 130) allocates memory to the received data packet from, for example, data memory 125 of the network processor 100. At step 515, the data packet is stored in the data memory. At step 520, the ingress module 130 instructs the input packet queue processor 115 to add the data packet to the input queue.

Referring back to step 515, the data packet is stored one or more of the buffers of the data memory 125. The data memory 125 contains a plurality of configurable size buffers. If the size of a received data packet is larger than the buffer size, the data packet is split into a number of portions and each of the portions is stored in a buffer. The ingress module 130 (or a packet buffer chain generation unit working in cooperation with the ingress module 130) links each of the buffers having portions of the data packet to form a packet buffer chain for the data packet.

Referring back to step 520, the network processor 100 ensures that the data packet is accessible by the core processor 105 only after all portions of the data packet are written into the data memory 125. The ingress module 130 attaches a semaphore to memory write operations that write the data packet to the memory. The input packet queue processor 115 is does not send a data packet to the requesting core processor until all portions of the data packet are written to the data memory. When all the portions of the data packet are written, the semaphore wakes up the input packet queue processor 115 indicating that complete data packet is written into the memory. The input packet queue processor 115 may then send the data packet to requesting core processor. The core processor then pauses the background tasks and resumes its high-priority function.

Figure 6:
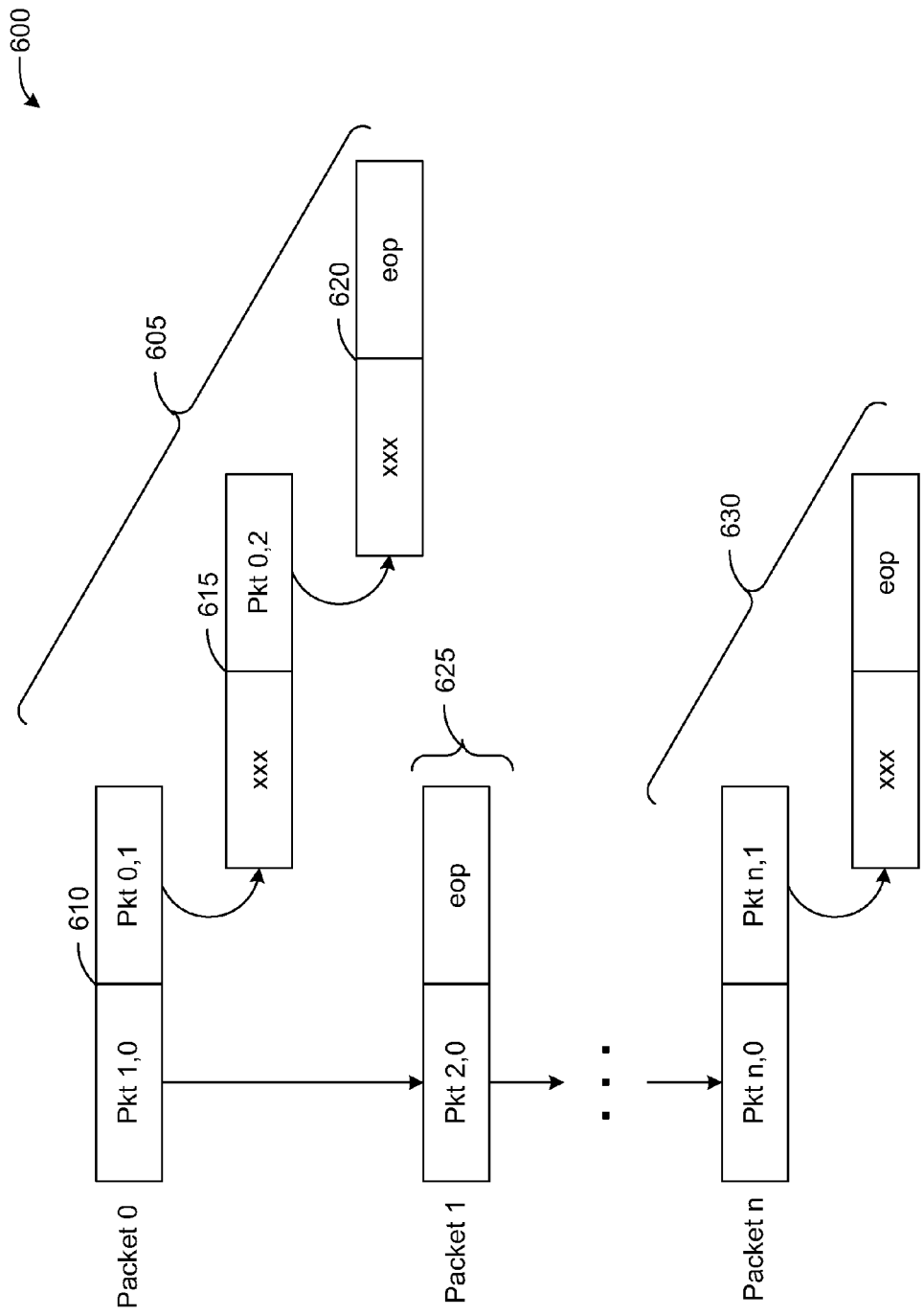
FIG. 6 is a block diagram illustrating an example of a structure for representing data packets stored in a memory of a network processor of FIG. 1.

FIG. 6 is a block diagram illustrating an example 600 of a structure for representing data packets stored in a memory of a network processor, according to an embodiment of the disclosed technique. The example 600 may be implemented in a network processor such as network processor 100 of FIG. 1. The data packets received by the ingress module 130 are stored in the data memory 125. In an embodiment, the control memory 120 may have packet buffer structures that contain pointers to the data packets stored in the data memory 125. For example, for a data packet "Packet 0" stored in the data memory 125, the control memory 120 may store a packet buffer chain 605 containing packet buffer structures 605, 610, and 615 that have pointers to the buffers containing data packet "Packet 0." The network processor 100 provides access to the data packets stored in the data memory 125 through the control memory 120 using the above packet buffer structures.

If a size of the data packet is lesser than the size of the buffer of the data memory, the data packet is stored in a single buffer. If the data packet is stored in a single buffer, the packet buffer chain for the data packet may have only packet buffer structure. For example, the packet buffer chain 625 for data packet "Packet 1" has only one packet buffer structure. On the other hand, when a size of the data packet is larger than the size of the buffer, the data packet is split into a number of portions and the portions are stored in a number of buffers. Each of the buffers containing portions of the data packet is linked to form a packet buffer chain such as packet buffer chain 605. A packet buffer structure can include two pointers, a next data packet pointer for pointing to a next data packet in the input queue, and a next buffer pointer for pointing to the next buffer of the same data packet. In some packet buffer structures one or none of the pointers may be used.

In the example 600, for data packet "Packet 0," the first packet buffer structure 610 (also referred to as header packet buffer structure 610) of the packet buffer chain 605 includes a pointer "Pkt 1,0" that points to the next data packet "Packet 1" in the input queue, and the next buffer pointer "Pkt 0, 1" that points to the next buffer containing the next portion of the data packet "Packet 0." In the packet buffer structure 615, however, only next buffer pointer "Pkt 0,2" is used. The next packet pointer is not used. The next packet pointer can have a null value. In the last packet buffer structure 620 (also referred to as tail packet buffer structure 620) of the packet buffer chain 605, none of the pointers are used. The next packet pointer can have a null value. The next buffer pointer can have a value, for example, end of packet (EOP), that indicates that the current buffer is the last buffer in the packet buffer chain 605 for the data packet "Packet 0."

The packet buffer structures and packet buffer chains are created when the data packets are stored in the data memory 125. When the data packet is added to the input queue, a pointer to the header buffer structure of the packet buffer chain of the data packet is added to the input queue. If the input queue already contains data packets, the next packet pointer in the header buffer structure of the last data packet is updated to point to the header buffer structure of the data packet added to the input queue. For example, when the data packet "Packet 1" is added to the input queue, the next data packet pointer of the header packet buffer structure 610 is updated to point to the header buffer structure of the data packet "Packet 1."

When the core processor requests a data packet from the input packet queue processor 115, the input packet queue processor 115 obtains the data packet (pointer to the packet buffer structure of the data packet) from the head of the input queue and returns it to the core processor. In an embodiment, similar packet buffer structures may be used for queuing the data packets in the output queues of the network processor 100.

Figure 7:
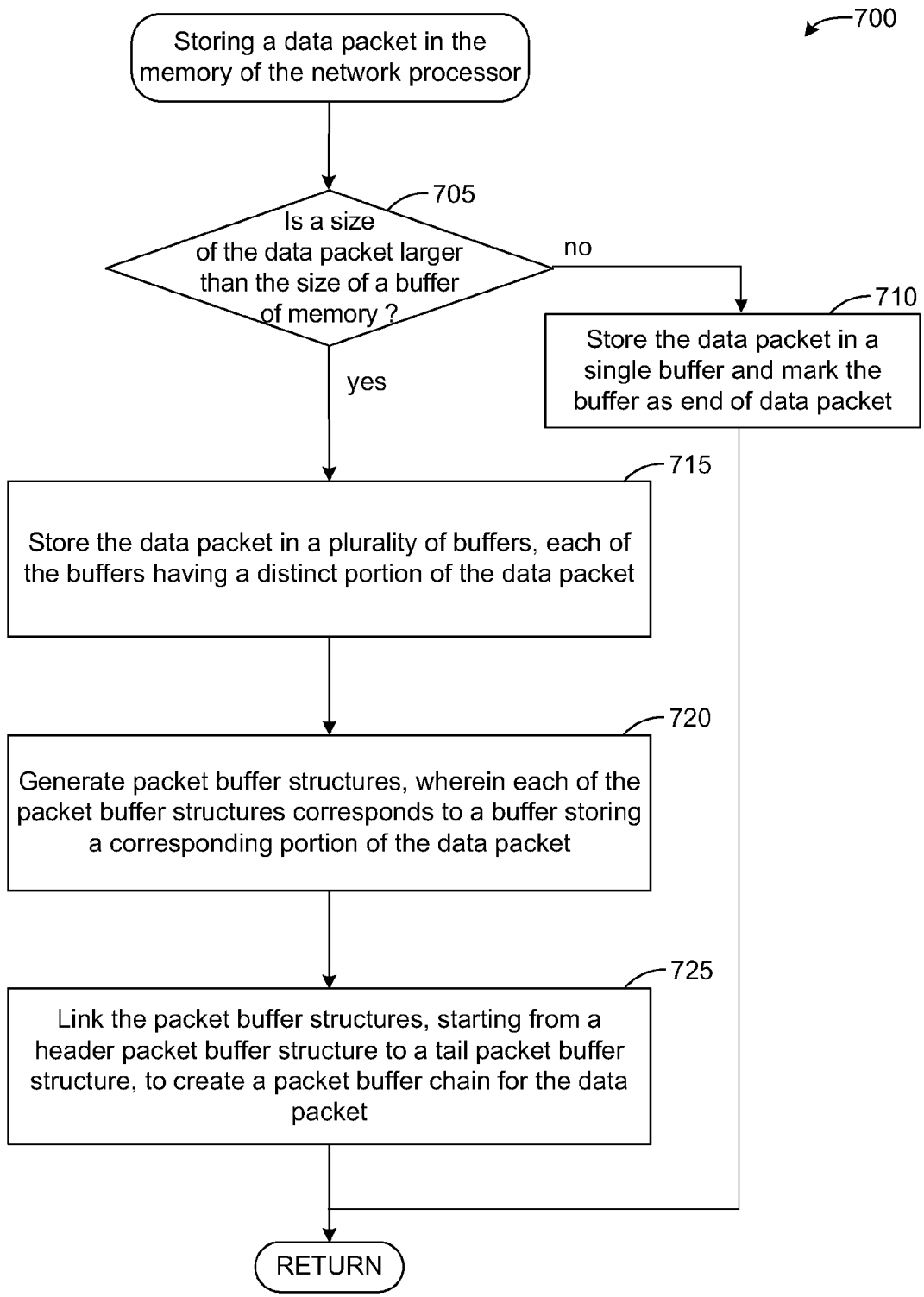
FIG. 7 is a flow diagram illustrating a process of storing the data packet in a memory of the network processor of FIG. 1.

FIG. 7 is a flow diagram illustrating a process 700 of storing the data packet in a memory of the network processor, according to an embodiment of the disclosed technique. The process 700 may be executed by a network processor such as network processor 100 of FIG. 1. At determination step 705, the ingress module 130 determines whether a size of the data packet is larger than the buffer size of the data memory 125 of the network processor 100. Responsive to a determination that the data packet size is not larger than the buffer size, at step 710, the ingress module 130 stores the data packet in a single buffer and creates a packet buffer structure with a value indicating that the packet buffer structure is the last buffer structure in the packet buffer chain for the data packet.

On the other hand, responsive to a determination that the data packet size is larger than the buffer size, at step 715, the ingress module 130 stores the data packet in a number of buffers, each of the buffers having a distinct portion of the data packet. At step 720, the ingress module 130 (or a packet buffer generation unit that works in cooperation with the ingress module 130) generates a packet buffer structure for each of the buffers storing a portion of the data packet. At step 725, the ingress module 130 links each of the packet buffer structures, starting from a header packet buffer structure corresponding to a first buffer containing a first portion the data packet to the tail buffer structure corresponding to a last buffer containing the last portion of the data packet, to create a packet buffer chain for the data packet.

Figure 8:
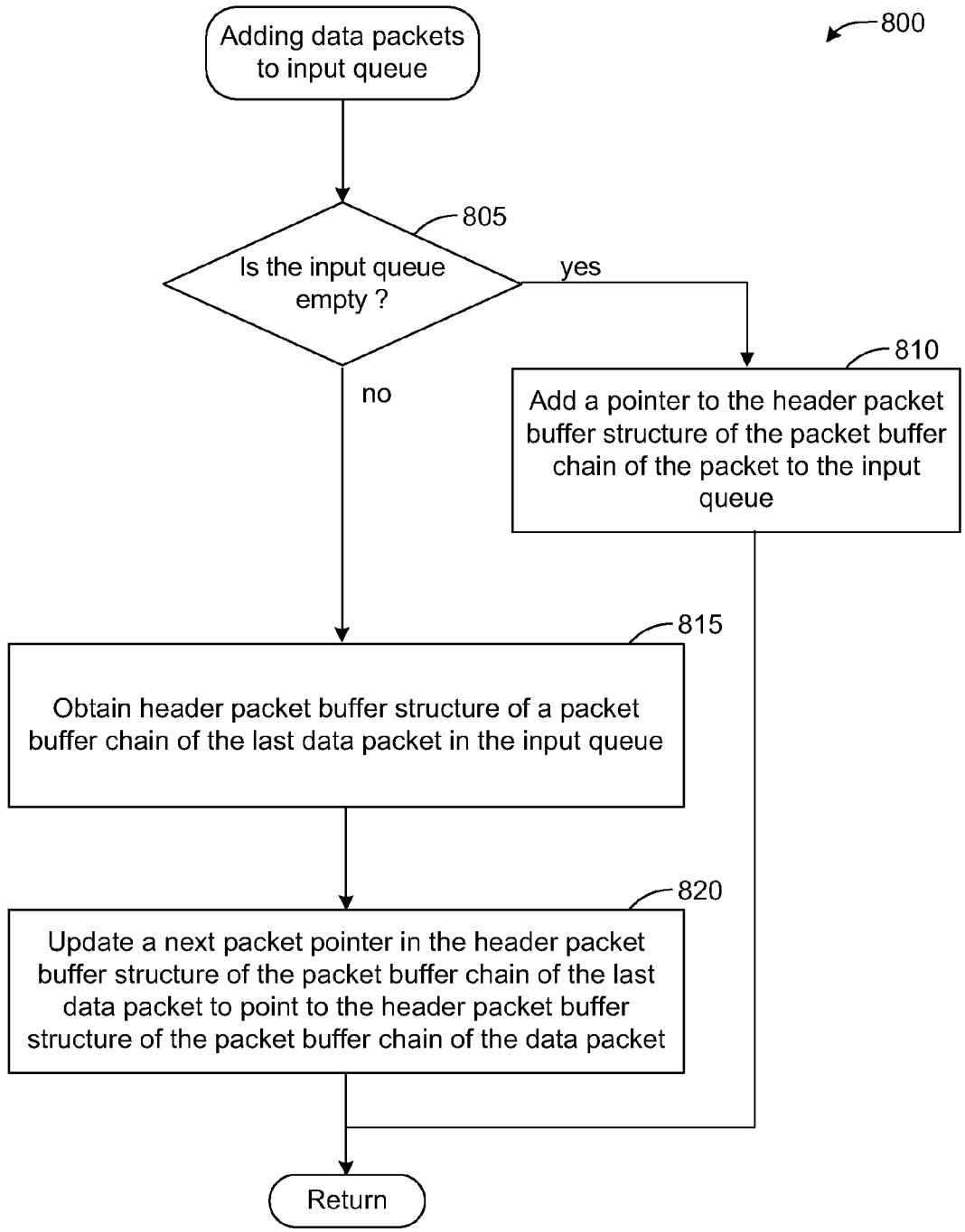
FIG. 8 is a flow diagram of process for adding a data packet to an input queue of a network processor of FIG. 1.

FIG. 8 is a flow diagram of process 800 for adding a data packet to an input queue of a network processor, according to an embodiment of the disclosed technique. The process 800 may be executed by a network processor such as a network processor 100 of FIG. 1. Adding the data packet to the input queue includes adding a pointer that points to the header buffer structure of a packet buffer chain of a data packet to the input queue. After writing the data packet to the memory, the ingress module 130 sends an instruction to the input packet queue processor 115 to add the data packet to the input queue. At determination step 805, the input packet queue processor 115 determines whether the input queue is empty. Responsive to a determination that the input queue is empty, at step 810, the input packet queue processor 115 adds a pointer to the header packet buffer structure of the packet buffer chain of the data packet to the input queue, and the process 800 returns.

Responsive to a determination that the input queue is not empty, at step 815, the input packet queue processor 115 obtains a header buffer structure of the packet buffer chain of the last data packet in the input queue. At step 820, the input packet queue processor 115 updates the next packet pointer of the header packet buffer structure of the last data packet in the input queue to point to the header packet buffer structure of the packet buffer chain of the data packet added to the input queue.

Figure 9:
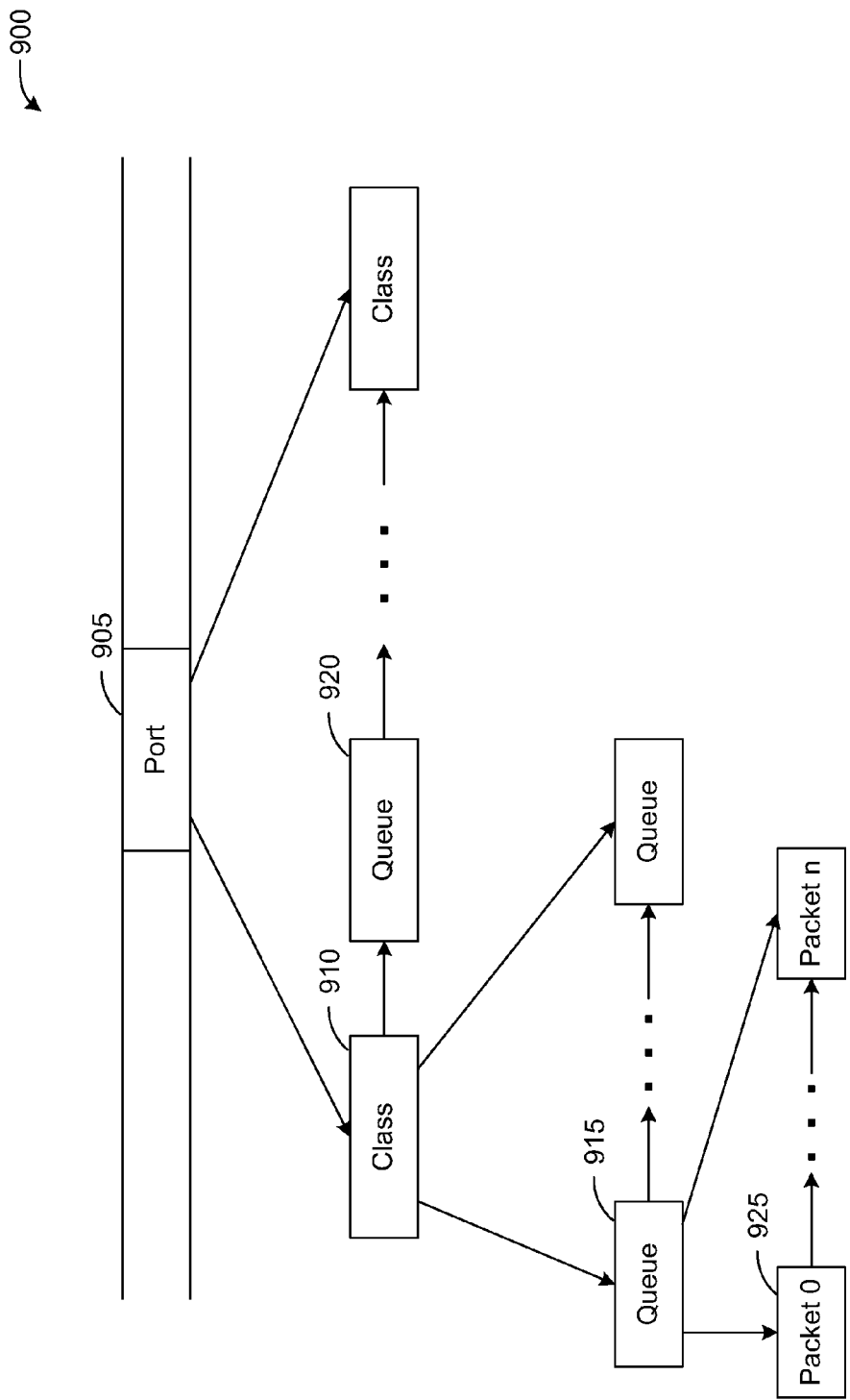
FIG. 9 is a block diagram of an output queue structure of a network processor of FIG. 1.

FIG. 9 is a block diagram of an output queue structure 900 of a network processor, according to an embodiment of the disclosed technique. The output queue structure 900 may be implemented in a network processor such as network processor 100 of FIG. 1. The network processor 100 forwards the data packets to their corresponding next hop addresses based on the QoS contracted to the data packets. For example, video streaming data may be guaranteed a pre-defined bandwidth and/or speed, a class of senders may be guaranteed a pre-defined bandwidth and/or speed, email data may have lower priority than video data, etc. Accordingly, the video data may be forwarded before email data. The QoS contracted to the data may be based on a number of policies. The output queue structure 900 provides a number of output queue classes and output queues for queuing output data packets based on the QoS contracted to the data packets. The egress module 135 fetches the data packets from the appropriate output queue classes and/or output queues based on the QoS contracted to the data packet and forwards them to their next hop addresses.

The output queue structure 900 is a hierarchical structure of ports of an output link of the network processor 100, output queue classes and output queues. Every output queue class and an output queue can be associated with a specific QoS. A port 905 has a set of output queue classes such as output queue class 910 and the output queue class 910 has a set of output queues such as output queue 915. For example, an output queue class can have an output queue for each sender that is part of that output queue class. In an embodiment, an output queue such as output queue 920 can be directly linked to the port 905 of the output link instead of an output queue class.

Each of the output queue classes and/or output queues is allocated a certain amount of resource. For example, if for a given time period an output queue class is allocated five percent (5%) of the bandwidth and the output queue class has five output queues in it, each of the output queues can be allocated one percent (1%) of the bandwidth, or four of the queues can be allocated one half percent (0.5%) of the bandwidth and one of the output queues may be allocated three percent (3%) of the bandwidth. The output queues and the output queue classes can be set up in number of ways based on the QoS contracts agreed with the senders. When the data packets are processed by the network processor, the amount of bandwidth consumed by each of the data packets is tracked, for example, by metering operations of FIG. 4. If an amount of the resource consumed by a particular output queue class or an output queue exceeds the pre-defined limit, a number of pre-defined actions may be performed on the data packets belonging to those output queue classes or output queues including dropping the data packets.

The data packet 925 is added to the output queue 915 based on a queue ID of the data packet 925, which is obtained, for example, during the table look up operations of FIG. 4. The queue ID identifies the output queue class or the port to which the output queue of the data packet 925 belongs. Accordingly, the output packet queue processor 140 adds the data packet 925 to the appropriate queue 915.

Figure 10:
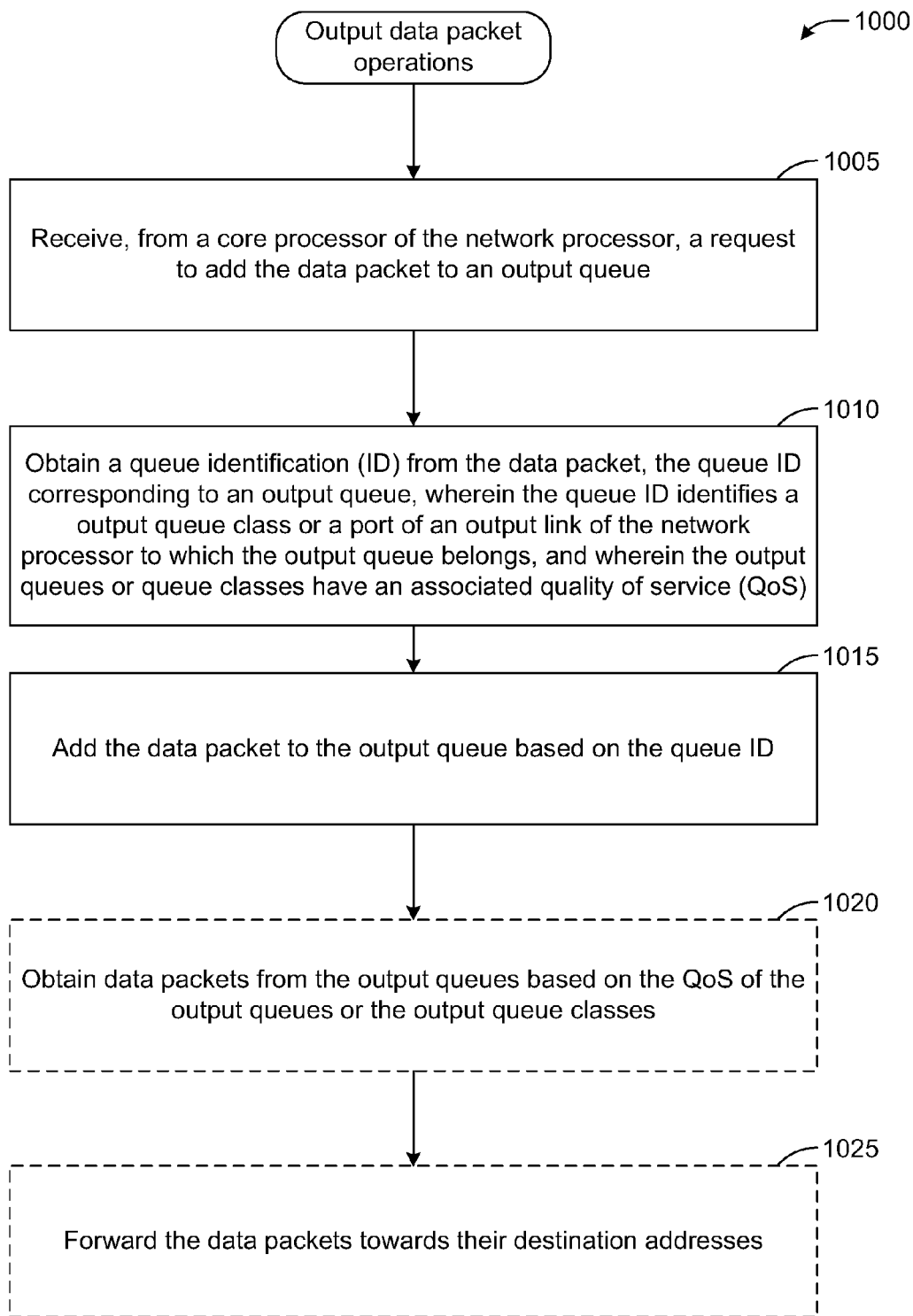
FIG. 10 is a flow diagram illustrating a process of processing output data packets.

FIG. 10 is a flow diagram illustrating a process 1000 of processing output data packets, according to an embodiment of the disclosed technique. The process 1000 may be executed in a network processor such as network processor 100 of FIG. 1. At step 1005, the output packet queue processor 140 receives a request from the core processor 105 to add the data packet to an output queue. At step 1010, the output packet queue processor 140 obtains the queue ID of the data packet. The queue ID identifies the output queue class or the port to which the output queue of the data packet belongs. At step 1015, the output packet queue processor 140 adds the data packet to the identified output queue of the output queue structure. At step 1020, the egress module 135 obtains the data packets from the output queues based on the QoS associated with the output queues and/or output queue classes. At step 1025, the egress module 135 forwards the data packets to their corresponding next-hop addresses.

Referring back to step 1005, the output queue requests from various core processors or various threads of a specific core processor are stored in a request queue of the output packet queue processor 140 on a FIFO basis.

Referring back to step 1015, in an embodiment, the output queue structure 900 includes only output queue classes and/or output queues that contain data packets. The output queue structure 900 is not a complete list of all output queue classes or output queues that can be defined for the network processor 100. When a data packet is added to an output queue, if the output queue is empty, the output queue is added to an output queue class to which it belongs. If the output queue class is itself empty, that is, does not already exist in the output queue structure 900, the output queue class is created in the output queue structure 900 and the output queue is added to the output queue class. The data packet is then added to the output queue.

Referring back to step 1020, the process (steps 1005-1015) of adding the data packets to the output queue structure 900 is independent of the process (steps 1020-1025) of forwarding the data packets towards their next hop destination. The egress module 135 may obtain the data packets from the output queue structure 900 independent of when the data packets are added to the output queue structure 900. That is, the data packets added to the output queue structure 900 may not be immediately forwarded to their next-hop addresses. The egress module 135 fetches the data packets from the output queues or output queue classes based on the QoS associated with the output queues or output queue classes. For example, if video data is guaranteed higher bandwidth than email data, the output queues or output queue classes containing video data packets may be served first and the output queues or output queue classes containing email data packets may be served later.

Figure 11:
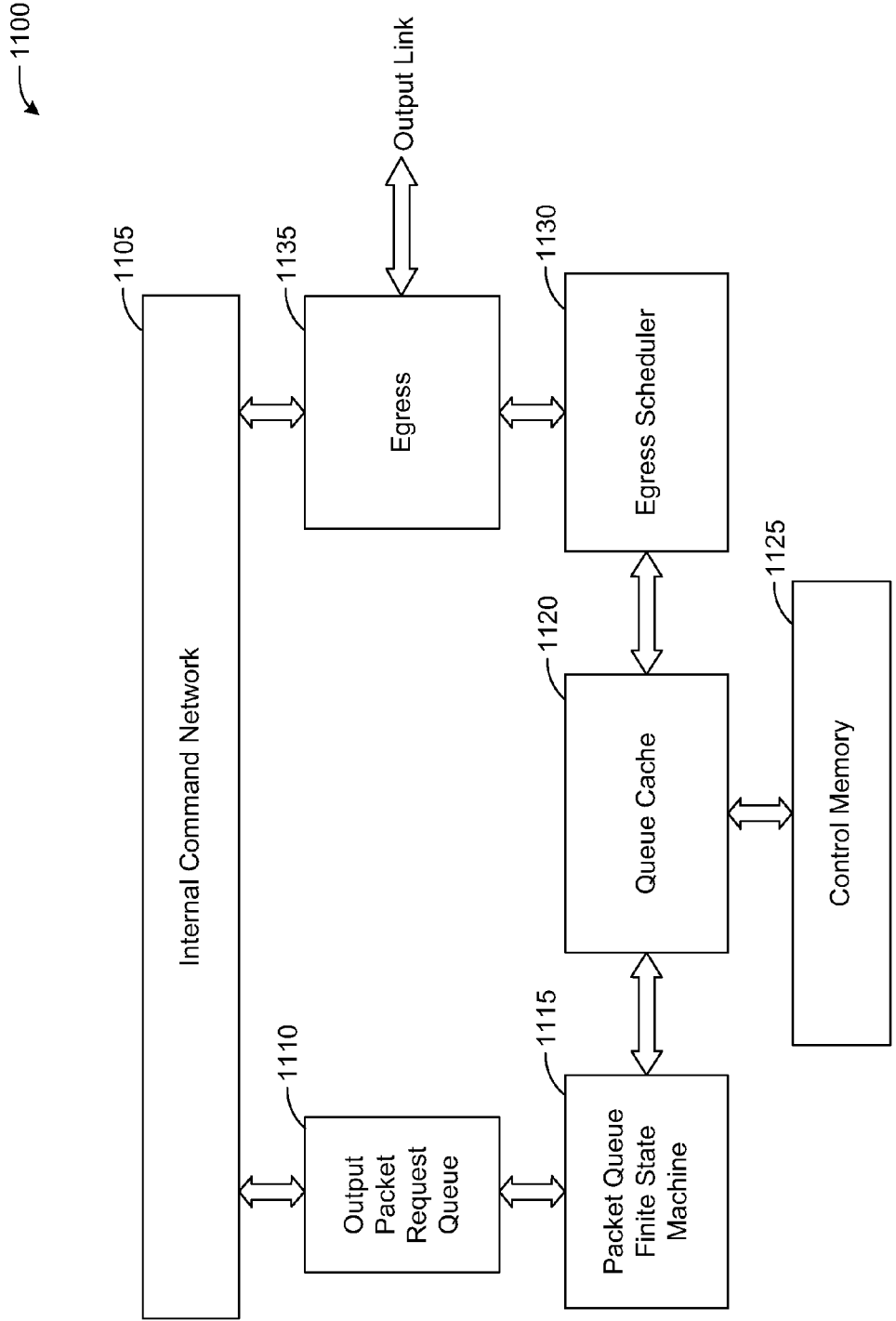
FIG. 11 is a block diagram illustrating an egress module of a network processor of FIG. 1.

FIG. 11 is a block diagram of a system 1100 illustrating an egress module 1135 of a network processor, according to an embodiment of the disclosed technique. The egress module 1135 can be similar to the egress module 135 of network processor 100 of FIG. 1. The core processors request the output packet queue processor 140 to add the processed data packets to the output queue structure. The queue requests can include information regarding an output queue class and/or output queue to which the data packet belongs, and a pointer to header packet buffer structure of the data packet. The output packet queue processor 140 receives the queue requests via internal command network 1105, and stores them in an output packet request queue 1110 on a FIFO basis.

A packet queue finite state machine module 1115 retrieves the queue requests from the output packet request queue 1110 on FIFO basis. After retrieving a queue request, the packet queue finite state machine module 1115 requests the control memory 1125 to read the output queue header structure/output queue class header structure of the output queue/output queue class into a queue cache 1120 for a given queue ID associated with the data packet. Once the header structure is loaded, the packet queue finite state machine module 1115 identifies the corresponding output queue and/or output queue class of the data packet, and adds the data packet to the output queue.

In an embodiment, the network processor 100 can support up to a million output queues or output queue classes. An output queue class or output queue header structure identifies a particular output queue or queue class to which a data packet belongs, a weight of the output queue or queue class, address to the next output queue or output queue class, a bit that indicates whether the output queue belongs to a output queue class or a port, etc. The header structures can be stored in control memory 1125 (similar to control memory 120 of FIG. 1) or in other memory such as data memory 125 from which the control memory 120 can fetch.

An egress scheduler 1130 retrieves the data packets from the output queues or output queue classes based on the QoS associated with them, and the egress module 1135 forwards the data packets to their corresponding next-hop addresses via the output link of the network processor 100. The output link of the network processor can be based on network processor streaming interface (NPSI). For example, the egress scheduler 1130 looks at the output queue classes and/or the output queues using information about how much bandwidth has been allocated to each of the output queues or output queue classes to do a fair round robin, or easily weighted round robin, to give priority to the output queue classes or output queues that have more bandwidth. But over a period of time, every output queue or output queue class would get processed if they have a certain amount of bandwidth allocated.

In cases where other queues have higher priority (QoS) such as voice or video, queues which are on a best-effort basis, such as email, would only be processed when the higher-priority queue quotas have been satisfied.

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device (s) or a memory includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method comprising:
receiving, at a network processor having a plurality of core processors and a plurality of special purpose processors, a plurality of data packets; and
performing, by a core processor of the core processors, a set of network operations on a data packet of the data packets, the performing a set of network operations including
requesting, by the core processor, a special purpose processor of the special purpose processors to perform a subset of the set of network operations on the data packet atomically,
performing, by the special purpose processor, the subset of the network operations on the data packet atomically, and performing the set of network operations on the data packet in a single thread of the core processor, the set of network operations performed being dependent on a networking protocol.

2. The method of claim 1 further comprising:
forwarding, by the network processor and based on a quality of service (QoS) associated with each of the data packets, the data packets towards their corresponding destination addresses.

3. The method of claim 1, wherein the networking protocol includes Resource Reservation Protocol (RSVP).

4. The method of claim 3, wherein the set of network operations performed in the RSVP includes at least one of (i) error checking, (ii) metering, (iii) policing, (iv) generating statistics, or (v) table look-ups for obtaining addresses to forward the data packets towards their destination addresses.

5. The method of claim 4, wherein the subset of network operations performed by the special purpose processors include at least one of (i) metering, (ii) policing, (iii) generating statistics, or (iv) table look-ups for obtaining addresses to forward the data packets towards their destination addresses.

6. The method of claim 1, wherein requesting the special purpose processor to perform the subset of the set of network operations atomically includes
sending, by the core processor and with the request, a semaphore to the special purpose processor, the semaphore associated with a thread of the core processor that is requesting the special purpose processor to perform the subset of the set of network operations.

7. The method of claim 6, wherein the semaphore allows shared resources of the network processor to be accessed by the thread executing the set of network operations on the data packet atomically.

8. The method of claim 7, wherein the thread of the core processor switches to a sleep mode when the semaphore indicates that the shared resources are being accessed by the special purpose processor.

9. The method of claim 7, wherein the thread of the core processor switches to an active mode when the semaphore indicates that the special purpose processor has posted results of the request to the core processor.

10. The method of claim 1, wherein the set of network operations on the data packet are performed by only (i) one of the core processors, and (ii) one of a plurality of threads of the one of the core processors.

11. The method of claim 1, wherein the receiving the data packets includes
allocating, by an ingress module of the network-processor, memory to each of the data packets, and
storing the data packets in the memory.

12. The method of claim 11, wherein the core processor and the special purpose processor perform the set of network operations on the data packet by reading from or writing to the data packet stored in the memory allocated to the data packet.

13. The method of claim 11 further comprising:
adding the received data packets to an input queue of the network processor.

14. The method of claim 11, wherein the memory includes a plurality of buffers, and wherein each of the buffers is of a configurable size.

15. The method of claim 14, wherein storing the data packets in the memory includes
determining whether a size of the data packet exceeds the configurable size of a buffer of the buffers,
responsive to a determination that the size of the data packet exceeds the configurable size of the buffer, storing the data packet into one or more buffers of the memory, each of the one or more buffers containing a portion of the data packet, and
linking each of the one or more buffers to generate a packet buffer chain for the data packet.

16. The method of claim 15 further comprising:
adding the data packet to an input queue, the adding including adding a pointer to the packet buffer chain of the data packet.

17. The method of claim 16, wherein the data packet is sent to a requesting core processor after all portions of the data packet are stored in the one or more buffers allocated to the data packet.

18. The method of claim 17, wherein the packet buffer chain is a plurality of packet buffer structures linking the one or more buffers of the data packet starting from a header buffer structure to a tail buffer structure, wherein the header packet buffer structure corresponds to a first buffer of the one or more buffers containing a first portion of the data packet, and wherein the tail packet buffer structure corresponds to a last buffer of the one or more buffers containing a last portion of the data packet.

19. The method of claim 18, wherein
the header packet buffer structure includes
(i) a next packet pointer that points to a packet buffer chain of a next data packet of the data packets added to the input queue, and
(ii) a next buffer pointer that points to a next buffer of the one or more buffers containing a next portion of the same data packet, and
the tail packet buffer structure includes
a marker indicating that the tail packet buffer structure is an end of the data packet.

20. The method of claim 19, wherein adding the data packets to the input queue includes linking a current packet buffer chain of a current data packet in the input queue with a new packet buffer chain of a new data packet of the data packets added to the input queue.

21. The method of claim 11, wherein performing the set of network operations on the data packets by the core processors includes
requesting, by a plurality of threads of each of the core processors, the data packets from the input queue.

22. The method of claim 21, wherein the threads of the core processors requesting the data packets are added to a data packet request queue.

23. The method of claim 21, wherein the threads in the data packet request queue are served on a First-In-First-Out (FIFO) basis.

24. The method of claim 21, wherein the threads in the data packet request queue are switched to sleep mode until the data packets are available in the input queue.

25. The method of claim 2, wherein forwarding the data packets based on a quality of service (QoS) associated with each of the data packets includes
receiving, at an output packet processor of the network processor and from the core processors, a command to add the data packets to an output queue structure, and
adding the data packets to the output queue structure.

26. The method of claim 25, wherein the output queue structure is a hierarchical structure having a plurality of output queues, each of the queues belonging to (i) one of a plurality of queue classes, or (ii) one of a plurality of ports, the ports corresponding to an output link of the network processor, and each of the queue classes belonging to one of the ports.

27. The method of claim 26, wherein each of the queue classes or queues corresponds to a pre-defined QoS.

28. The method of claim 26, wherein adding the data packets to the output queue structure includes
- obtaining, from a particular data packet of the data packets, a queue identification (ID) of the particular data packet,
- identifying, based on the queue ID, a particular output queue to which the particular data packet belongs, and
- adding the particular data packet to the particular queue.

29. The method of claim 28 further comprising:
- retrieving, by an egress module of the network processor and based on the QoS of the queues or the queue classes, the data packets from the output queues; and
- forwarding the data packets towards their corresponding destination addresses.

\* \* \* \* \*